United States Patent [19]
Johnson et al.

[11] Patent Number: 5,903,599
[45] Date of Patent: May 11, 1999

[54] TRANSCEIVER AND METHOD FOR REPORTING STATE TRANSITIONS IN A COMMUNICATION SYSTEM

[75] Inventors: Terence L. Johnson; Jeffrey P. Gleason; Howard E. Levin; Peter R. Molnar, all of Austin, Tex.; Jean-Louis Dolmeta, Plaisance du Touch, France

[73] Assignee: Motorola, Inc., Schaumburg, Ill.

[21] Appl. No.: 08/744,078

[22] Filed: Nov. 4, 1996

[51] Int. Cl.$^6$ .................................................. H04B 1/38
[52] U.S. Cl. ........................................ 375/219; 375/222
[58] Field of Search .................................. 375/219, 222; 395/377; 364/141, 152

[56] References Cited

U.S. PATENT DOCUMENTS

| | | | |
|---|---|---|---|
| 4,009,346 | 2/1977 | Parker et al. ................................ 179/15 |
| 4,363,093 | 12/1982 | Davis et al. ............................... 364/200 |
| 4,438,511 | 3/1984 | Baran ......................................... 370/94 |
| 4,679,227 | 7/1987 | Hughes-Hartogs ........................ 379/98 |
| 4,731,816 | 3/1988 | Hughes-Hartogs ........................ 379/98 |
| 4,980,897 | 12/1990 | Decker et al. ............................. 375/38 |
| 5,168,495 | 12/1992 | Smith ...................................... 370/85.6 |
| 5,574,934 | 11/1996 | Mirashrafi ............................... 395/800 |
| 5,708,415 | 1/1998 | Van Lente et al. ....................... 340/525 |
| 5,752,062 | 5/1998 | Gover et al. ............................. 355/800 |
| 5,784,649 | 7/1998 | Begur et al. ............................. 395/872 |
| 5,790,550 | 8/1998 | Peeters et al. ........................... 370/480 |

OTHER PUBLICATIONS

Alliance for Telecommunications Industry Solutions, "Asymmetric Digital Subscriber Line (ADSL) Metallic Interface", Draft American National Standard for Telecommunications, Network and Customer Installation Interfaces, T1E1.4/94–007R7, pp. i–xii and pp. 2–171.

*Primary Examiner*—Stephen Chin
*Assistant Examiner*—Mohammad Ghayour
*Attorney, Agent, or Firm*—Daniel D. Hill

[57] ABSTRACT

A host processor (22) in a communication system (10) identifies a level of program visibility for reporting predetermined activation state changes, and signals a communications transceiver (24) to begin an initialization process. The communications transceiver (24) begins executing a series of states (51–55, 61–64) for initializing the communication system (10). A determination is made by the transceiver (24) whether a state change has occurred. A state change is identified and reported to a host processor (22) based on the program visibility select level.

15 Claims, 3 Drawing Sheets

TRANSCEIVER AND METHOD FOR REPORTING STATE TRANSITIONS IN A COMMUNICATION SYSTEM

FIELD OF THE INVENTION

The present invention relates to communications in general, and more specifically to a transceiver and method for reporting state transitions in a communication system.

BACKGROUND OF THE INVENTION

In order to make high data rate interactive services such as video conferencing available to more residential and small business customers, high-speed data communication paths are required. Although fiber optic cable is the preferred transmission media for such high data rate services, it is not readily available in existing communications networks, and the expense of installing fiber optic cable is prohibitive. Current telephone wiring connections, which consist of copper twisted-pair media, are not designed to support the data rates, or bandwidth, required for interactive services. Asymmetric Digital Subscriber Lines (ADSL) technology has been developed to increase the effective bandwidth of existing twisted-pair connections, allowing interactive services to be provided without requiring the installation of new fiber optic cable.

Discrete Multi-Tone (DMT) is a multicarrier technique that divides the available bandwidth of twisted-pair connections into many subchannels, or bins. The DMT technique has been implemented in ADSL standard T1.413 for use in ADSL systems. In ADSL, DMT is used to generate 250 separate 4.3125 kHz subchannels from 26 kHz to 1.1 MHz for downstream transmission to the end user, and 26 subchannels from 26 kHz to 138 kHz for upstream transmission by the end user.

The rate at which data is to be transmitted is a function of whether or not a device is implemented as an ADSL central office terminal (ATU-C) or an ADSL remote terminal (ATU-R). According to the ADSL standard T1.413, a device used in an ADSL communications system is designated as either an ATU-C or an ATU-R before digital communications can be initiated.

Initialization of an ADSL transceiver requires the execution of several initialization steps which, in terms of modern semiconductor device operation, take a long time (several seconds). Individual initialization steps include activation and acknowledgment, transceiver training, channel analysis, exchange, and steady state. Individual activation states specify functions necessary to establish a communications channel between a local and a non-local ADSL transceiver.

Each initialization step has numerous individual activation states which when combined comprise the individual initialization step. The execution of the initialization steps, and more specifically the associated activation states require a long initialization time. In certain instances, where synchronization to a specific activation state would be desirable, it would be advantageous for the current state of the ADSL transceiver to be available externally. For example, such synchronous operation would be desirable for interfacing to a debug/development tool, or for sequencing other externally controllable events to an individual activation state of the transceiver.

Prior art teaches several methods of specifying current state activity for modern semiconductor devices such as microprocessors. One such method requires the "polling" of a device in order to identify a current state of operation. Polling generally entails performing a read access to the device having a state which is desired to be known. Such a scheme requires continuous polling in order to have resolution such that the beginning of a transceiver state can be recognized. Continuous polling limits the bandwidth of the device doing the polling. For example, an external processor may be able to poll only one device where it is necessary to identify precisely where a specific state is entered. Therefore, there is a trade-off between the amount of resolution that is attainable, and the number of devices a polling device can control.

A second method of determining the state of a given device is accomplished by performing a breakpoint-type function. The breakpoint-type function is used to monitor an address bus, or a state machine for a specific identifying value. Once a breakpoint is identified, internal hardware or software of the device being polled by a host can continuously monitor for the occurrence of a particular address or state. For example, if in a device using firmware, it is known that a specific state begins at an address location called "ADDR", a register could be set to the value of ADDR, which is in turn compared to the address bus of the device being polled. When the address bus is equal to the value of ADDR, an interrupt breakpoint would be generated. This requires knowing where precisely, in code, a state location desired to be identified resides, as well as the additional overhead of the hardware needed to perform the breakpoint. In addition, the generation of breakpoints interrupts the function of the device being polled, which delays the overall operation of the device.

Therefore, it would be desirable to have state information provided in a time and hardware efficient manner that would allow the synchronization of devices controllable external to the device without requiring the host to generate an interrupt and without the host needing to monitor the code.

DETAIL DESCRIPTION OF A PREFERRED EMBODIMENT

In operation, a host processor identifies a program visibility select level, and signals a communications transceiver to begin an initialization process. The communications transceiver begins executing a series of states for initializing the communications system. A determination is made by the communications system whether a state change has occurred in an initialization step. New state changes are identified and reported to a host processor based on the program visibility select level.

Figure 1:
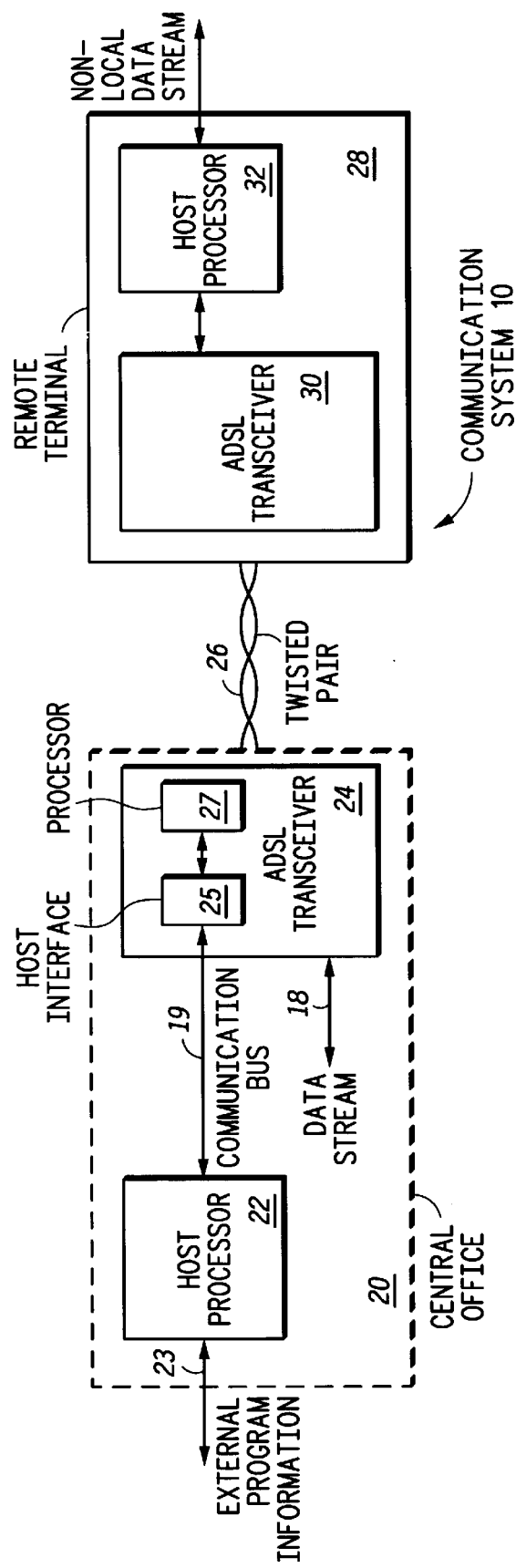
FIG. 1 illustrates, in block diagram form, a communications system in accordance with the present invention.

FIG. 1 illustrates, in block diagram form, ADSL communications system 10 in accordance with the present invention. Communications system 10 comprises an ADSL central office 20 (ADSL-C), an ADSL remote terminal 28 (ADSL-R), and a twisted pair 26 connecting the ADSL-C to the ADSL-R. The central office 20 comprises a host processor 22, connected bidirectionally to communications bus 19 to an ADSL transceiver 24. Communications bus 19 may be either a serial or parallel bus. The ADSL transceiver 24 further transmits or receives a data stream 18 which will represent information to be transmitted over the twisted pair 26. Note that in other embodiments, twisted pair 26 may be replaced with another communication medium, such as for example, a fiber optic cable or a coaxial cable. The data stream represents data information such as digital video, audio, or data. In addition, the ADSL transceiver 24 further comprises a host interface 25 bidirectionally coupled to an embedded processor 27. In one embodiment, embedded processor 27 is a digital signal processor engine. However, in other embodiments, embedded processor 27 may be any type of central processing unit (CPU).

As shown in FIG. 1, remote terminal 28 comprises an ADSL transceiver 30 bidirectionally coupled to a host processor 32 and receiving a non-local data stream. For purposes of discussion, the central office 20 will be focused upon, however, it should be understood that the remote terminal 28 would also benefit from the present invention and the following discussion is applicable to both.

In operation, the host processor 22 of the central office 20 initiates an initialization of the ADSL transceiver 24 via the information passed over the communications bus 19. This initialization can be prompted by external program information 23 received by the host processor 22. The initialization information on the communications bus 19 is received by ADSL transceiver 24 via the host interface 25. Although not illustrated in FIG. 1, host processor 22 may control more than one transceiver 24. Also, host processor 22 may initialize either the local or the non-local transceiver.

Host interface 25 is bi-directionally connected to processor 27 of ADSL transceiver 24. The host interface 25 provides the information on the communications bus 19 to the processor 27. Once the initialization command is recognized by the processor 27, the processor 27 will initiate a number of initialization steps in order to configure itself as well as the remote terminal 28 for operation. For example, based on a user's input the external program information 23 can indicate to the host processor 22 to initialize the ADSL transceiver 24. This will be accomplished via the communications bus 19. When received by the host interface 25 of the ADSL transceiver 24, the command would be passed along to the processor 27 which would begin a sequence of ADSL initialization steps. The representation of the ADSL initialization steps can be seen in FIG. 2. As a result of these initialization steps, individual activation states occur. Theses activation states include such steps as transmitting initialization information to the remote terminal. Therefore, while the central office 20 is going through an initialization process, the remote terminal 28 is also going through a similar initialization process based on information received by the ADSL transceiver 24 across twisted pair 26.

Figure 2:
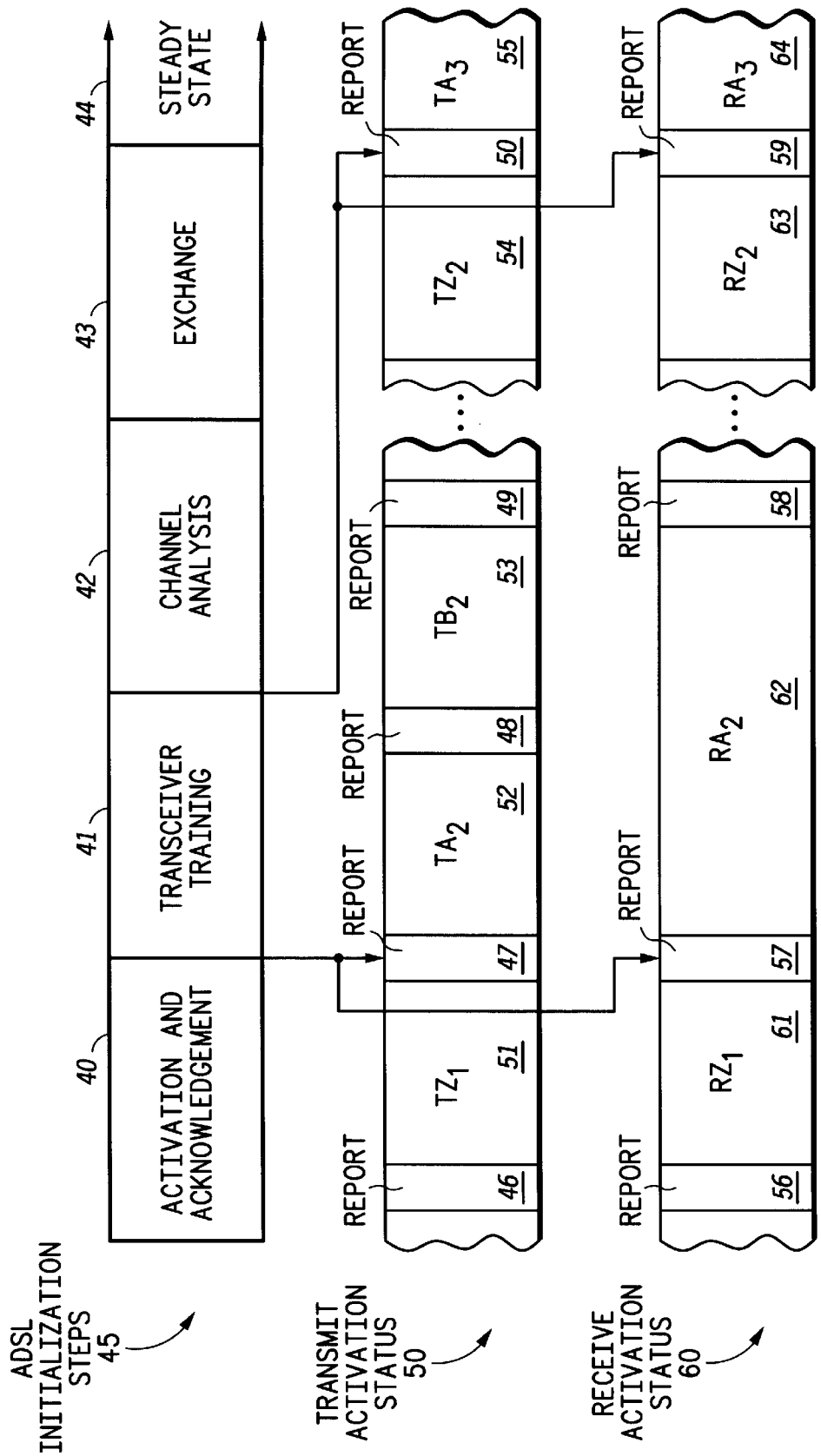
FIG. 2 illustrates, in sequential diagram form, a sequence of ADSL initialization steps and activation states.

FIG. 2 illustrates a flow diagram of the ADSL initialization steps 45. The ADSL initialization steps 45 include activation and acknowledgment step 40, transceiver training step 41, channel analysis step 42, exchange step 43, and steady state step 44. Transmit activation status 50 and receive activation status 60 are examples of substeps, or states, accomplished when the transceiver is in one of the ADSL initialization steps 45, such as transceiver training step 41.

Activation and acknowledgment step 40 generally comprises acknowledging the initialization signal whether originated at the local and/or the non-local end of the communications system 10. Transceiver training step 41 generally comprises the synchronization and training of the adaptive filters of the ADSL transceiver 24. Channel analysis step 42 generally comprises characterization of the communications system channel. Exchange step 43 generally comprises the conveyance of parameters from the local and non-local systems to one another such that an optimal system configuration can be obtained. Steady state step 44 generally comprises the transmission and reception of data as specified by the ADSL specification during normal operation.

Each of the initialization steps, 40 through 44, further comprise a plurality of substeps, or states, known as activation states. By way of example, these states are represented in FIG. 2 by the states $TZ_1$ 51, $TA_2$ 52, $TB_2$ 53, $TZ_2$ 54, and $TA_3$ 55, for the transmit portion of the ADSL transceiver 24. Similarly, for the receive portion of the ADSL transceiver, the activation states are represented by $RZ_1$ 61, $RA_2$ 62, $RZ_2$ 63, and $RA_3$ 64. In accordance with the present invention, a report state separates each of the activation states. For example, a report state 47 resides between $TZ_1$ 51 and $TA_2$ 52. In a similar fashion, it can be seen that report states 46 through 50 and 56 through 59 are used to separate other activation states. Each of these report states are used to identify the transition from a previous state to a new activation state. The report state is generally included at the beginning of the activation state it is to identify. Note that the activation steps for initializing the communication system includes both transmit states and receive states for initializing, for example, a data modem, as illustrated in FIG. 2.

In operation, each of the activation states, such as $TZ_1$ 51, could be implemented as a sequence of computer instructions, such as would be found in firmware. Each of these sequence of instructions would implement a specific activation state. For example, activation state $TZ_1$ 51, could further be comprised of firmware for implementing a specific activation. In another embodiment, the activation state $TZ_1$ 51, could be controlled by a state machine and not have firmware associated with it. In either case, at the onset, or beginning, of the activation state $TZ_1$ 51, the report state 41 would be entered. The function of report states 46 though 50 and 56 through 59, and a method of reporting, are further described with reference to flow diagram of FIG. 3.

Figure 3:
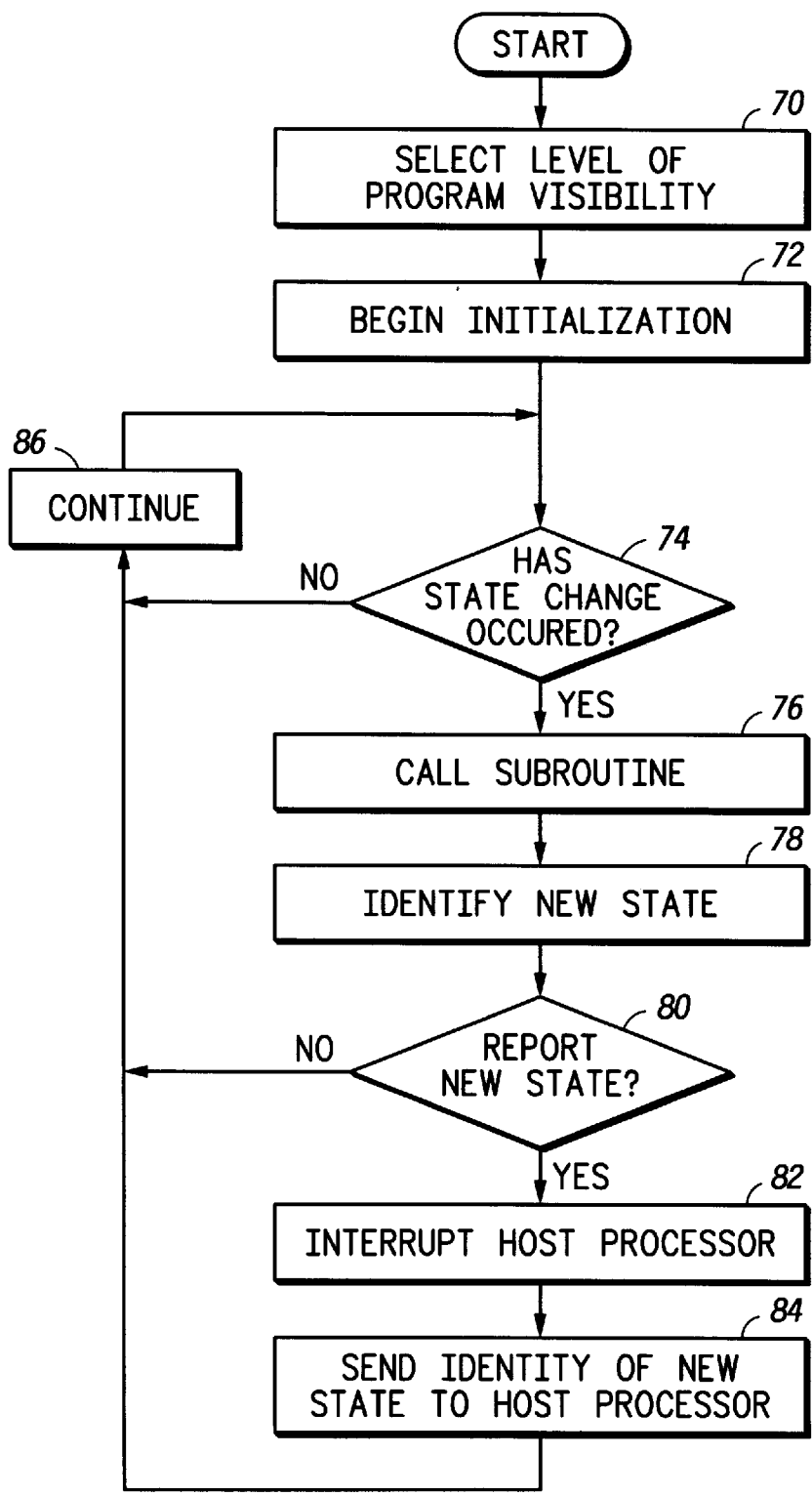
FIG. 3 illustrates, in flow diagram form, a method for reporting program flow through a communications system.

FIG. 3 illustrates a flow chart of steps used for reporting state transitions in accordance with the present invention. At step 70, a level of program visibility is selected. The selection of program visibility allows a user to indicate the degree of resolution, or granularity, desired to be reported from ADSL transceiver 24. While some users may only wish to be notified when a steady state initialization step 44 is reached, as indicated in FIG. 2, other users may have a need to know when individual activation states within a given initialization step of ADSL initialization steps 45 are encountered. By selecting a level of program visibility, the user has the flexibility to view: (1) a minimum or default level of reporting; (2) an overview level of reporting; (3) a detail level of reporting, and (4) specific states to be reported as selected by the user. For example, the minimal state transitions to be reported may include the transition into the steady state initialization step 44. This would traditionally signal the user that the transceiver is available to receive and transmit data.

The overview level, when selected at step 70, would provide autonomous status messages to the host processor 22 when a new initialization state is entered. For example when the transceiver training step 41 is first initialized, a report 47 would be generated to the host processor 22. Similarly, when the channel analysis step 42, or exchange step 43 are entered, a report would be generated and sent to the host interface 22.

The detailed level of reporting, when selected at step 70, would provide autonomous state messages upon entrance to each activation step throughout the initialization. Referring to FIG. 2, the reported states would be transmitted to host processor 22 during the detailed level of reporting when each of states $TZ_1$ 51, $TA_2$ 52, etc. are entered. In other words, for each activation state of the ADSL initialization steps 45, the embedded processor 27 would send a status report to the host identifying the particular activation state. A specific level of reporting would be similar to that of the detailed level of reporting, except a user would be allowed to mask out individual activation states that the user is not interested in monitoring. In this manner, only those activation states selected through a mask register (not shown) would be allowed to be transmitted to host processor 22.

Returning to the flow diagram of FIG. 3, at step 72, the initialization of the transceiver 24 is begun. At this point, the transceiver 24 has received the level of program visibility and has been told to go through an initialization procedure, such as the initialization procedure illustrated in FIG. 2. The initialization of ADSL transceiver 24, in a preferred embodiment will cause the execution of firmware stored within a memory (not shown) associated with the processor 27 of FIG. 1. This firmware, as previously discussed, will have a number of instructions implementing each activity state. At decision step 74 the program flow is monitored for transitions from one activation state to a new activation state, when a transition occurs, the YES path is taken, and a subroutine is called as illustrated in step 76. For example, when activation and acknowledgment step 40 is begun, a determination will be made that a state change has occurred and flow will proceed to the step 76. The determination of step 74 is analogous to the report states 46 through 50 and 56 through 59. The subroutine call is also represented in each of the individual report states of FIG. 2.

Next, at step 78, the new activation state is identified. This state information will generally be passed from the calling location in the firmware. At step 80, a determination is made as to whether or not to actually report the identity of the new state to the host processor. This determination will be made based upon the programmed level of visibility. If the identity of the new state is to be reported, the YES path is taken to step 82. At step 82, an interrupt is generated and sent to host processor 22. This interrupt autonomously signals host processor 22 that a state change has occurred. At step 84, the identifying information which reports the actual state entered will be sent to host processor 22 such that host processor 22 is interrupted and notified of the identity of the new activation state. Once this information has been identified and sent to host processor 22, flow proceeds to step 86.

At step 86, the flow would continue with the execution of a next instruction of the initialization program and will continue until steady state 44 is reached. The identity of the activation state is effectively placed in a queue and transmitted to host processor 22 later, when the process to service the call to the subroutine is executed by embedded processor 27. Next, at step 74, the program execution continues as long as the ADSL transceiver functions. For example, after steady state 44 is reached, no transitions typically occur except for error conditions which may cause a transition to, for example, a reset state. If upon a reset or power-up condition, the initialization steps 40 through 44 would be once again executed, causing interrupt to the host processor at step 82 and the subsequent reporting of step 84. The reporting of state changes will continue as long as the transceiver is operating.

The implementation of the invention described herein is provided by way of example only, and other implementations may exist for executing the function described herein. For example, while four visibility levels are identified herein, fewer or more levels may be used. Additionally, while a preferred embodiment implements the initialization steps using firmware, dedicated hardware could be used.

While the present invention has been illustrated and described with reference to specific embodiments, further modifications and improvements will occur to those skilled in the art. It is to be understood, therefore, that this invention is not limited to the particular forms illustrated herein and that the appended claims cover all modifications that do not depart from the scope and spirit of this invention.

What is claimed is:

1. A method for program-flow reporting in a transceiver of a communication system having a program-flow, wherein the program-flow is for initializing the communication system and includes a plurality of activation states, the method comprising the steps of:

selecting one or more states of the plurality of activation states to be reported during the program-flow, wherein the one or more states of the plurality of activation states are selected states;

selecting a reporting level from a predetermined number of reporting levels, wherein the predetermined number of reporting levels includes a reporting level for reporting an identity and a beginning of each selected state of the plurality of activation states, wherein the identity of the selected state is included at a transition to each of the selected states in the program-flow;

detecting, during the program-flow, each of the selected states;

if a selected state is detected, interrupting a host processor of the transceiver; and reporting the identity of the selected state to the host processor.

2. The method of claim 1, wherein the steps of interrupting and reporting are a portion of a subroutine that is called when a selected state is detected.

3. The method of claim 2, wherein the plurality of steps for initializing the communication system includes both transmit states and receive states for initializing a data modem.

4. The method of claim 1, wherein the program-flow reporting is for observing predetermined operations of program execution of the communication system.

5. A transceiver for use in a data modem, comprising:

an embedded processor for executing an initialization program for establishing communication with another transceiver, the initialization program including a plurality of states, wherein predetermined states of the plurality of states are selected for reporting, the embedded processor for monitoring the initialization program, and in response to a detected state, reporting an identity of the detected state, wherein the detected state is determined in response to detecting one of the predetermined states; and a host interface, coupled to the embedded processor, for interrupting a host processor of the data modem when the detected state is identified, and for allowing the host processor to retrieve the identity of the detected state.

6. The transceiver of claim 5, wherein the data modem is characterized as being in an asymmetric digital subscriber line (ADSL) communication system.

7. The transceiver of claim 5, wherein the predetermined states to be detected is determined by a user.

8. The transceiver of claim 5, wherein the identity reported is used to control when data can be received.

9. The transceiver of claim 5, wherein the identity of the detected state is included at a transition of the detected state in the initialization program.

10. The transceiver of claim 5, wherein the embedded processor is characterized as comprising a digital signal processor engine.

11. The transceiver of claim 5, wherein reported states are user selectable from a predetermined number of reporting levels, wherein the predetermined number of reporting levels have a preprogrammed amount of reporting detail.

12. A method for program-flow reporting in a transceiver of a communication system having a program-flow, wherein the program-flow is for initializing the communication system and includes a plurality of activation states, the method comprising the steps of:

selecting one or more states of the plurality of activation states to be reported during the program-flow;

selecting a reporting level from a predetermined number of reporting levels wherein the predetermined number of reporting levels includes a reporting level for reporting an identity and a beginning of each selected state of the plurality of activation states, wherein the identity of the selected state is included at a transition to each of the selected states in the program-flow;

detecting, during the program-flow, a transition from one of the plurality of activation states to a new state of the plurality of activation states;

determining that the transition to the new state is one of the plurality of states to be reported;

interrupting a host processor of the transceiver; and reporting the identity of the new state of the plurality of states to the host processor.

13. The method of claim 12, wherein the communication system is characterized as being an asymmetric digital subscriber line (ADSL) communication system.

14. The method of claim 12, further comprising the step of controlling receipt a data stream in the transceiver after the step of reporting an identity of the new state.

15. The method of claim 12, wherein the plurality of states is included in an initialization program of a data modem.

* * * * *